Dec. 10, 1963 B. J. BEVAN ETAL 3,113,742

RECORD MEDIUM WINDER

Filed May 25, 1961 2 Sheets-Sheet 1

INVENTOR.
BERNARD J. BEVAN
CARL P. ANDERSON

BY

Strauch, Nolan & Neale

ATTORNEYS

INVENTOR.
BERNARD J. BEVAN
CARL P. ANDERSON

BY

Strauch, Nolan & Neale
ATTORNEYS

United States Patent Office 3,113,742
Patented Dec. 10, 1963

3,113,742
RECORD MEDIUM WINDER

Bernard J. Bevan, Highland Park, and Carl P. Anderson, Evanston, Ill., assignors to SCM Corporation, a corporation of New York Filed May 25, 1961, Ser. No. 112,630
9 Claims. (Cl. 242—67.1)

This invention relates to a record medium winder and is particularly related to an accessory for use with teletypewriters, typewriters and other continuous sheet record, single or multi-copy data reproduction machines to wind up the copy record (usually paper) as it feeds from the machine platen.

In the particular art for which this invention is applicable, most of the development in record handling has evolved around devices which control the unwinding of paper from heavy rolls rather than devices which enable formation of a roll of recorded message record page in strip form. Desirably, a record medium winder for page size strip records should be simple in construction with few moving parts, it should be capable of rolling up the record in a smooth even roll as it comes from the printer, at the same time preventing slack and keeping the record strip taut and accomplishing such operation without creating excess strain on the strip. While accomplishing the foregoing features, the winder unit must still permit the recording machine to back-pull as much of the record as may be required under certain aspects of recording machine operation.

The invention hereinafter disclosed accomplishes the above noted desirable and advantageous features in a rather simplified construction which is fully automatic, has few parts and can be attached as a self-powered auxiliary unit to any well-known teleprinter or typewriter.

Accordingly, a principal object of this invention resides in the provision of a novel sheet record winder, fully automatic, compact, with few parts and which is readily adapted to fit previously known teleprinters or typewriters.

Another object resides in the provision of a novel auxiliary, self-powered sheet record winder which can be readily and easily attached and removed from its associated recording machine.

Still another object resides in the provision of a novel sheet record winder for recording machines which is capable of rolling up the sheet record as it feeds from the machine, maintaining the paper relatively taut at all times to prevent forming of slack, and yet not creating undue strain on the sheet record which may cause it to be torn or mutilated.

In connection with the foregoing object, a further object resides in the novel provision of an adjustable slip clutch in the drive train of the winder which enables sufficient drive torque to maintain tautness of the sheet record while still permitting the recording machine to back-pull the sheet record whenever and as much as necessary to avoid interference with certain machine operations, such as platen shifting.

Still another object resides in the provision of a novel sheet record winder for recording machines which, when mounted on the machine, is situated so the winding axis lies at specific angular cant relative to the axis of the platen of the recording machine, thereby causing the sheet record to be wound smoothly and evenly, eliminating torn and ragged edges and preventing the sheet record from running off the free end of the winder spindle as it is wound in a roll.

Further novel features and other objects of this invention will become apparent from the following detailed description, discussion and the appended claims taken in conjunction with the accompanying drawings showing a preferred structure and embodiment, in which:

Before proceeding with the description of structural details it is noted that, in the past, recorded copy from page printers normally was removed and used as it was printed or the record was passed over the back of the printer into a fanfold bin. However, in some instances, e.g., monitor sheet records, it has been found desirable to store the sheet records in rolls. Also, the advent of multi-copy records has resulted in the demand for roll storage of the recorded material. For convenience, the sheet record will be referred to as paper, although it is to be understood that the sheet record may be made from any suitable material.

The basic principle of operation of the winder of this invention is as follows. The end of the paper coming from the printer is secured to a spindle on the winder and when the winder control switch is placed to "on" position, a rotative force is applied to the spindle and it begins to wind the paper as it feeds out of the printer. As slack is taken up between the spindle and the printer, a slip clutch incorporated in the winder drive train allows the winder motor to continue its rotation but the spindle ceases rotation. As more paper feeds from the printer the slip clutch instantly ceases slipping and the spindle again rotates, taking up the paper as it feeds from the printer, thus preventing any slack from occurring in the paper record.

Another version of this invention which is substantially identical to the main embodiment requires only a reversal of the direction of the motor rotation. Such a version is used primarily when multiple record copy is being run on the printer or copy machine. In this second version, as the paper leaves the printer it passes under the spindle rather than over the spindle. Thus, in the event a part of the top or original copy needs to be torn off for reference away from the printer, that torn off segment need not be discarded but can be replaced on the paper leaving the printer and passing under the roll where it will pass into the roll and is safely stored for future reference.

Figure 1:
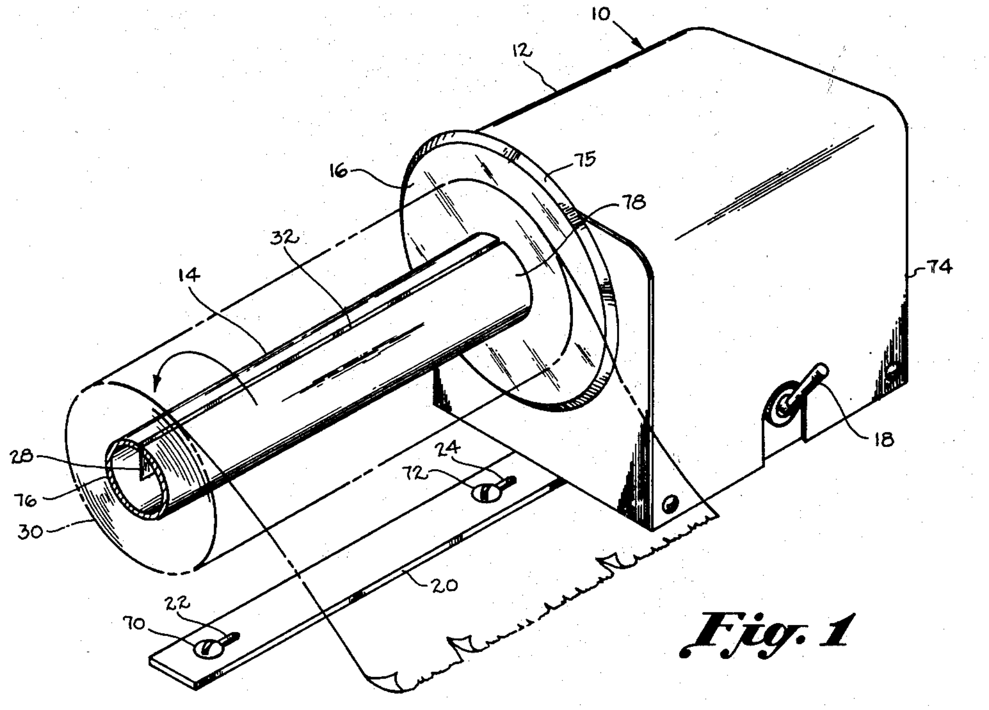
FIGURE 1 is a perspective view illustrating a winder made in accord with the present invention and shows the motor and gear housing, the sheet record spindle and the mounting bracket, a roll of the sheet record being shown in phantom lines on the spindle.
Figure 2:
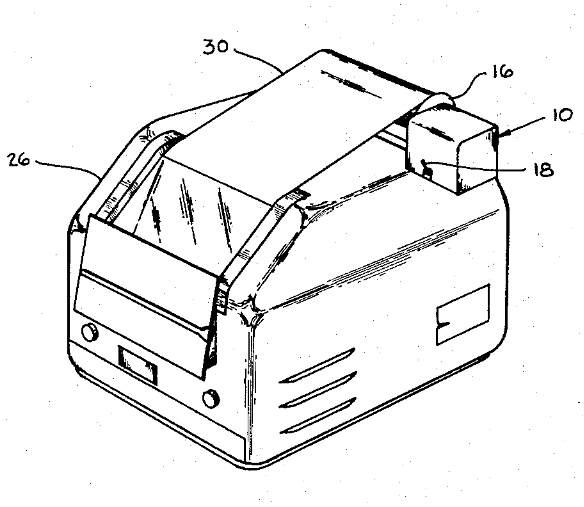
FIGURE 2 is a smaller scale perspective view illustrating the sheet record winder unit mounted on a commercial teleprinter in a manner appropriate for winding single copy of the sheet record being fed from the printer.

Referring now to the drawings for specific details of structure, FIGURE 1 illustrates an exemplary complete paper winder unit 10 which includes a main housing 12 and a winding spindle 14 carrying a roll edge aligning disc 16. Located at the front of housing 12 is an On-Off control switch 18. Directly below main housing 12 is a horizontally disposed attaching bracket 20 which can be either integral with or rigidly secured to the base plate of the housing. Two elongate slots 22 and 24 through bracket 20 enable the paper winder 10 to be attached by screws to any well-known communications printer machine such as designated by the reference character 26 in FIGURE 2, and their lateral disposition permits lateral adjustment of the complete winder unit 10 so the aligning disc 16 on spindle 14 will be located adjacent one edge of the paper feeding from communication machine 26.

The end 28 of paper strip 30 which feeds from the communications machine 26 is inserted into a slot 32 which extends the full length of spindle 14. As the paper 30 is threaded into the spindle slot 32, it is aligned with one of its edges abutted against the aligning disc 16 and the spindle is hand turned until a few turns of the paper are rolled onto spindle 14.

The winder control switch 18 is then turned on and instantly spindle 14 begins to rotate counterclockwise, as viewed in FIGURE 1, winding the paper 30 and taking up all slack between the paper winder 10 and communications printer 26.

Figure 3:
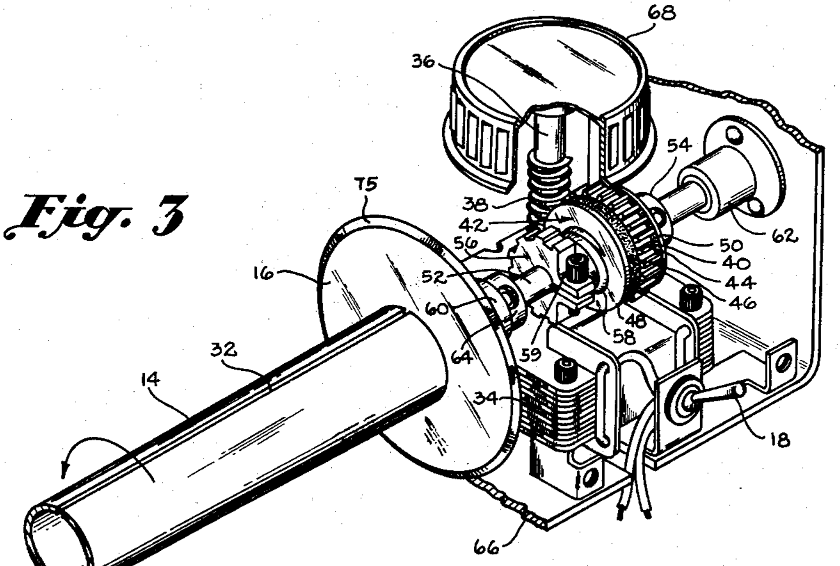
FIGURE 3 is a perspective view of the paper winder corresponding to the view in FIGURE 1 but with the outside cover removed and the frame and blower fan partially cut away to show the motor and drive train components.

Referring to FIGURE 3, when control switch 18 is turned to "On" position, an electric motor 34 is energized and its rotary shaft 36 starts rotation. Motor 34 is mounted on the base plate of frame 66 with its shaft 36 projecting vertically upward. Non-rotatably secured on the upwardly extended end of motor shaft 36 is a worm 38, the worm being meshed with a worm gear 40 which is mounted coaxial with and frictionally drive connected to the spindle, as will be further described. Worm gear 40 is the driving element of a slip clutch 42 which includes two felt discs 44 and 46, one on each side of the gear 40 and two washers 48 and 50, one located adjacent each of the two felt discs 44 and 46. The clutch units, gear 40, felt discs 44 and 46 and washers 48 and 50, are rotatably carried on a horizontal shaft 52 which also mounts a fixed back-up clutch collar 54, an adjustable split clutch pressure collar 56 and a clutch coil spring 58.

Split collar 56 holds the spring 58 in slight compression against the clutch washer 48 to provide just enough pressure between felt discs 44 and 46 to assure positive winding of the paper 30 when slack starts to occur between the paper winder 10 and the communications printer 26. The pressure is not enough to restrict rotation of gear 40 with clutch slippage when paper 30 becomes taut. Clamping screw 59 is provided in the split collar 56 to squeeze the split collar and clamp it in adjusted axial position when the proper spring pressure is attained.

Figures 4, 5, 6:
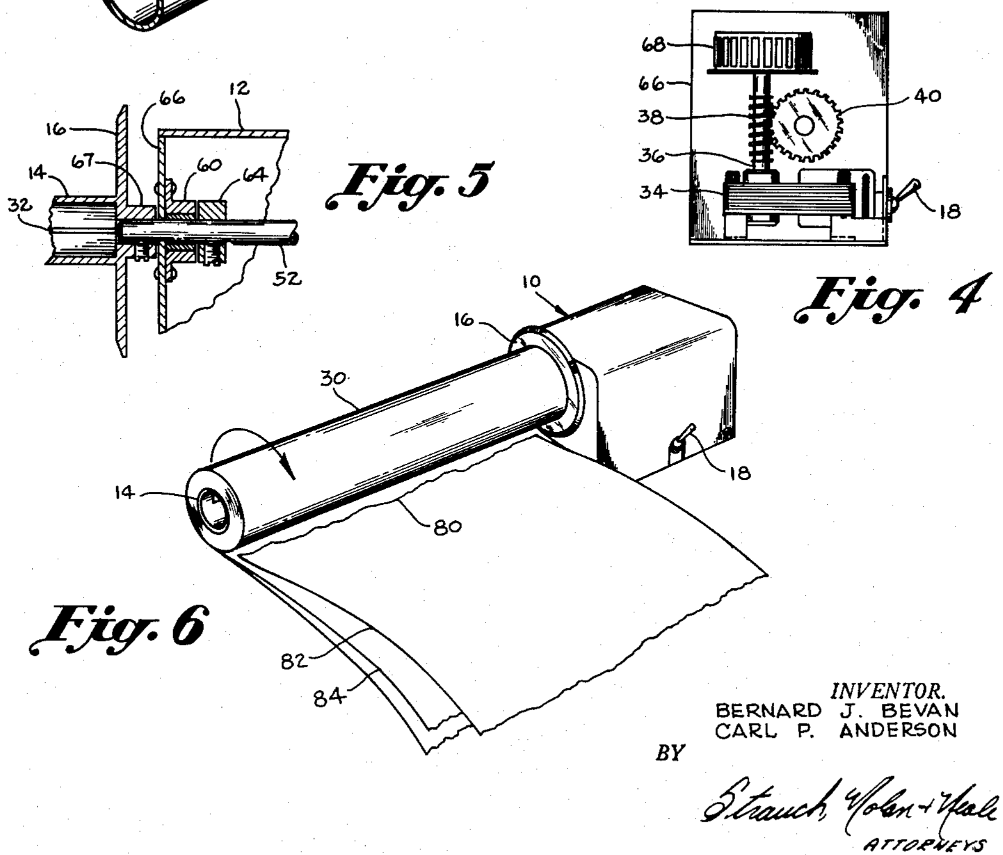
FIGURE 4 is a detail view showing the motor arrangement, the drive gears and associated parts more clearly.
FIGURE 5 is a detail horizontal section view through the spindle illustrating the spindle to shaft connection.
FIGURE 6 is a smaller scale perspective view of the paper winder showing the manner in which it may be used to wind multiple sheet record copy in the reverse direction.

Slip clutch 42 with its worm gear 40 is wholly supported by the shaft 52, the two ends of which are respectively journalled in a through bore bearing 60 and a socket bore bearing 62, lateral movement of the entire assembly being prevented in one direction by the socket bearing 62 and in the other direction by a collar 64 non-rotatably fastened on shaft 58 at the inside of frame 66 next to the through bore bearing 60 (see FIGURE 5). Bearings 60 and 62 are securely fastened to end walls of the frame 66 by screws or rivets and the shaft 52 projects through bearing 60 and the associated wall of frame 66 and connects to the hub 67 of spindle 14 and aligning disc 16 which mounts on shaft 52, as shown in FIGURE 5. Fastened on the upper end of the vertical motor shaft 36 is a small squirrel cage fan 68 which circulates and exhausts air from within the main housing 12 to reduce heat which may be created by the motor 34. Air may be drawn in and passed out through louvres (not shown) in the rear wall of housing 20.

In the event of a carriage shifting operation by the communications printer 26, the paper 30 must often be back-pulled and unwound slightly from the roll on spindle 14. This will be possible due to the precise light pressure setting of slip clutch 42, and thus back-pulling can be accomplished without tearing or the winder unit otherwise interfering with normal paper feeding, guiding and winding operations of the communications machine.

In connection with mounting and securing the paper winder 10 to the communications printer 26, at least one of the slots 22 or 24 is made at least 1/32" wider than the fastening screw to enable canting the spindle relative to the machine platen. For example, if slot 24 is the widest slot, the mounting screw 70 for slot 22 is screwed down fairly snug and mounting screw 72 for slot 24 is left momentarily somewhat loose. The right-hand end 74 of winder 10 is then canted 1/64" in a counterclockwise direction as permitted by the wide slot 24 and both screws 70 and 72 then screwed down tightly. Canting the axis of the paper winder spindle 14 in this manner causes the paper 30 to feed at an angle which inherently forces the paper 30 inwardly against the aligning disc 16 at all times and eliminates any tendency for the paper 30 to run off the end of the spindle as it is being wound. The periphery of alignment disc 16, being beveled as indicated at 75, enables smooth engagement between the paper edge and the disc periphery.

The spindle 14 is made with a very slight taper, free end 76 being slightly smaller than disc end 78 so that as soon as the desired amount of paper 30 is wound onto spindle 14, the entire roll may easily be removed from end 76.

FIGURE 6 shows the alternate version of the paper winder 10, the only mechanical difference being that motor 34 is installed, or wired, so that the spindle 14 rotates in the reverse or clockwise direction. This reversed rotation embodiment is intended primarily for use only on printers which print multiple record copies. As has been previously noted, in this embodiment the paper 30 will feed in on the underside of spindle 14 instead of over the top side as in FIGURE 1. The reason for this difference in operation, as has been explained, is that in multiple copying it may at times become necessary to tear out a section of the original copy for reference work away from the communication printing area. If it is then desired to return the torn out segment to the paper roll 30 (rather than discarding it), the paper roll 30 and the top layer of paper 84 being fed onto the paper roll 30 form a receiver into which the end 80 of the torn out segment can be inserted. After the torn out segment 82 is started into the roll, it can be left to roll onto the the paper roll 30 automatically.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a sheet record recorder machine, a winder for rolling the sheet record strip as it feeds out from said recorder machine comprising: a frame with support means secured on said recorder machine adjacent the feed out location of said sheet record; a motor secured in said frame with a rotary drive shaft; control means for said motor; a horizontal driven shaft journalled in said frame; a power gear train connecting between said motor shaft and said driven shaft including an adjustable friction slip clutch; a record strip roll spindle, having a record edge alignment flange and a mounting hub at one end, non-rotatably secured on said driven shaft, said alignment flange being radial to the spindle axis and the opposite end of said spindle being free for ease in removal of a sheet record roll; and means securing said support means on said recorder machine in a position disposing the axis of said spindle at a very slight canted angle away from a position exactly normal to the path of feed of said sheet record so that the sheet record feeds at said angle toward said flange whereby rotation of said spindle will inherently roll said sheet record with its rolled edge smoothly abutted against said flange.

2. The combination winder and sheet record recorder machine as defined in claim 1, wherein said radial alignment flange has a beveled surface adjacent its outer peripheral edge on the side of said flange facing toward the free end of said spindle.

3. A winder for rolling a sheet record strip as it passes out from a recorder machine comprising: a frame; a motor secured in said frame and having a rotary drive shaft; control means for said motor mounted on said frame; a horizontal driven shaft journalled in said frame; a power gear train connecting between said motor shaft and said driven shaft including an adjustable friction slip clutch; a record strip roll spindle having a mounting hub at one end non-rotatably secured on said driven shaft, the opposite end being free for ease in removal of a sheet record roll; a radially disposed annular, sheet record edge alignment flange provided on said spindle adjacent said mounting hub end; said adjustable friction clutch enabling drive slippage and reverse rotation of said spindle during operation of said motor upon being subjected to a very light torque load through said spindle; and attachment means provided on said frame adapted to secure said winder as an auxiliary unit to a sheet record strip recording machine; said attachment means includes means enabling an adjustable, intentional slightly skewed misalignment of the spindle axis relative to a line perpendicular to the normal path of a sheet record strip which will be wound on said spindle to assure that such a record strip will feed at an angle toward said flange.

4. A winder as defined in claim 3, wherein the side of said flange facing the free end of said spindle is beveled throughout an annular zone adjacent the outer periphery of said flange.

5. In combination with a sheet record recorder machine, a winder for rolling the sheet record strip as it feeds out from said recorder machine comprising: a frame with support means secured on a recorder machine adjacent the feed out location of said sheet record; a motor secured in said frame with a rotary drive shaft; control means for said motor; a horizontal driven shaft journalled in said frame; a power gear train connecting between said motor shaft and said driven shaft including an adjustable friction slip clutch; a record strip roll spindle, having a record edge alignment flange and a mounting hub at one end, non-rotatably secured on said driven shaft, the opposite end of said spindle being free for ease in removal of a sheet record roll; and means securing said support means on said recorder machine so that the axis of said spindle is substantially normal to the feed path of sheet record as it feeds from said recorder.

6. The combination winder and sheet record recorder machine as defined in claim 5, wherein said power train is connected and driven to rotate said spindle to wind said sheet record in a path passing over said spindle.

7. The combination winder and sheet record recorder machine as defined in claim 5, wherein said power train is connected and driven to rotate said spindle to wind said sheet record in a path passing under said spindle.

8. A winder for rolling a sheet record strip as it passes out from a recorder machine comprising: a frame; a motor secured in said frame with a rotary shaft; "on"-"off" control means for said motor; a horizontal driven shaft journalled in said frame; a worm and worm wheel speed step down gear train directly connecting between said motor shaft and said driven shaft including an adjustable friction slip clutch; said worm wheel being rotatably mounted on said driven shaft; said friction clutch including a driven plate secured to said driven shaft, a friction disc between and engaging said worm wheel and said driven plate and resilient means biasing said worm wheel against said friction disc; a record roll spindle having a record edge alignment flange and a mounting hub at one end non-rotatably secured on said driven shaft and its opposite end free for ease in removal of a roll.

9. A winder as defined in claim 8, wherein said means biasing said worm wheel against said friction disc includes a coil compression spring on said driven shaft with means at one end pressing against the opposite side of said worm wheel from said friction disc and a spring abutment collar non-rotatably secured and axially adjustable on said driven shaft engaging the other end of said spring.

References Cited in the file of this patent

UNITED STATES PATENTS

| | | |
|---|---|---|
| 634,191 | Truyter | Oct. 3, 1899 |
| 681,932 | Skirrow | Sept. 3, 1901 |
| 788,133 | Harrison et al. | Apr. 25, 1905 |
| 795,507 | Hatfield et al. | July 25, 1905 |
| 1,329,403 | Herbeil | Feb. 3, 1920 |
| 1,786,917 | Oehmichen | Dec. 30, 1930 |
| 1,890,243 | Zachert | Dec. 6, 1932 |
| 2,151,724 | Wengel et al. | Mar. 28, 1939 |
| 2,401,982 | Springhorn | June 11, 1946 |
| 2,424,739 | Canady | July 29, 1947 |
| 2,436,418 | Bradford | Feb. 24, 1948 |
| 2,496,977 | Bechle | Feb. 7, 1950 |
| 2,575,631 | Link | Nov. 20, 1951 |
| 2,621,500 | Clentimack | Dec. 16, 1952 |
| 2,675,190 | Wiig | Apr. 13, 1954 |
| 2,693,322 | Mercier | Nov. 2, 1954 |
| 2,695,139 | Horvath | Nov. 23, 1954 |
| 2,889,123 | Hayden | June 2, 1959 |